United States Patent
Casiraro et al.

(10) Patent No.: US 12,539,195 B2
(45) Date of Patent: Feb. 3, 2026

(54) ELECTROMAGNETIC TRACKING SENSOR HAVING A FLEXIBLE CORE, AND METHODS FOR MAKING SAME

(71) Applicant: Bard Peripheral Vascular, Inc., Franklin Lakes, NJ (US)

(72) Inventors: Matthew Casiraro, Tempe, AZ (US); Katherine Huffer, Chandler, AZ (US); Samuel Radochonski, San Francisco, CA (US); Ranjani Sampath Kumaran, Tempe, AZ (US)

(73) Assignee: BARD PERIPHERAL VASCULAR, INC., Franklin Lakes, NJ (US)

( * ) Notice: Subject to any disclaimer, the term of this patent is extended or adjusted under 35 U.S.C. 154(b) by 697 days.

(21) Appl. No.: 17/766,540

(22) PCT Filed: Oct. 11, 2019

(86) PCT No.: PCT/US2019/055805
§ 371 (c)(1),
(2) Date: Apr. 5, 2022

(87) PCT Pub. No.: WO2021/071502
PCT Pub. Date: Apr. 15, 2021

(65) Prior Publication Data
US 2023/0256211 A1  Aug. 17, 2023

(51) Int. Cl.
*A61B 90/00* (2016.01)
*A61B 5/06* (2006.01)
*A61B 34/20* (2016.01)

(52) U.S. Cl.
CPC ........... *A61B 90/39* (2016.02); *A61B 5/062* (2013.01); *A61B 2034/2051* (2016.02); *A61B 2090/3954* (2016.02)

(58) Field of Classification Search
CPC . A61B 90/39; A61B 5/062; A61B 2034/2051; A61B 2090/3954; A61B 5/065
See application file for complete search history.

(56) References Cited

U.S. PATENT DOCUMENTS

| | | |
|---|---|---|
| 3,775,841 A | 12/1973 | Lathouwers et al. |
| 3,829,806 A | 8/1974 | Lathouwers et al. |
| 4,433,474 A | 2/1984 | Hemmat |
| 5,530,416 A | 6/1996 | Wakamatsu et al. |
| 5,727,553 A | 3/1998 | Saad |

(Continued)

FOREIGN PATENT DOCUMENTS

| | | |
|---|---|---|
| CA | 2959279 A1 | 3/2016 |
| CN | 106256330 A | 12/2016 |

(Continued)

OTHER PUBLICATIONS

CN Office Action dated Jul. 2, 2024 pertaining to CN Application No. 201980101193.0 filed Apr. 8, 2022.

*Primary Examiner* — Dixomara Vargas
(74) *Attorney, Agent, or Firm* — Dinsmore & Shohl LLP

(57) ABSTRACT

An electromagnetic tracking sensor for use in a medical device includes a flexible hollow cylinder core having an interior surface and an exterior surface. The flexible hollow cylinder core has a magnetic material layer attached to the interior surface of the flexible hollow cylinder core. A wire coil is adjacent to, and circumferentially surrounds, the exterior surface of the flexible hollow cylinder core.

20 Claims, 7 Drawing Sheets

(56) References Cited

U.S. PATENT DOCUMENTS

| | | | |
|---|---|---|---|
| 7,734,354 B1* | 6/2010 | Cox | A61N 1/05 607/116 |
| 8,239,003 B2 | 8/2012 | Akins | |
| 8,994,366 B2 | 3/2015 | Ashe | |
| 9,659,706 B2 | 5/2017 | Qiu et al. | |
| 2003/0028095 A1* | 2/2003 | Tulley | G01R 33/287 600/422 |
| 2007/0112331 A1* | 5/2007 | Weber | A61M 25/0054 604/530 |
| 2007/0265637 A1* | 11/2007 | Andreas | A61F 2/966 623/1.11 |
| 2009/0118817 A1* | 5/2009 | Sandhu | A61F 2/07 623/1.42 |
| 2011/0066029 A1* | 3/2011 | Lyu | A61M 25/0133 600/424 |
| 2011/0130750 A1 | 6/2011 | Ormsby et al. | |
| 2013/0002085 A1 | 1/2013 | Hosek et al. | |
| 2016/0089515 A1 | 3/2016 | Hansen et al. | |
| 2016/0228180 A1 | 8/2016 | Sliwa | |
| 2016/0372252 A1 | 12/2016 | Gliner | |
| 2017/0323714 A1 | 11/2017 | Lazarus et al. | |
| 2017/0358388 A1 | 12/2017 | Buesseler | |
| 2018/0263688 A1 | 9/2018 | Barrish et al. | |
| 2019/0025040 A1 | 1/2019 | Andreason et al. | |
| 2019/0247050 A1* | 8/2019 | Goldsmith | A61F 2/82 |
| 2024/0207575 A1* | 6/2024 | Knutson | A61M 25/007 |

FOREIGN PATENT DOCUMENTS

| | | |
|---|---|---|
| CN | 103860196 B | 9/2017 |
| CN | 105682597 B | 6/2018 |
| WO | 2016038434 A1 | 3/2016 |

* cited by examiner

ELECTROMAGNETIC TRACKING SENSOR HAVING A FLEXIBLE CORE, AND METHODS FOR MAKING SAME

CROSS-REFERENCE TO RELATED APPLICATIONS

This application is a U.S. National Phase of International Application No. PCT/US2019/055805, entitled "ELECTROMAGNETIC TRACKING SENSOR HAVING A FLEXIBLE CORE, AND METHODS FOR MAKING SAME" and filed Oct. 11, 2019, which is incorporated herein by reference in its entirety.

TECHNICAL FIELD

The present invention relates to an electromagnetic tracking sensor, and, more particularly, to an electromagnetic tracking sensor having a flexible core.

BACKGROUND ART

Inductors and transformers are typically constructed with magnetic core materials, such as iron, nickel, or ferrous materials. Magnetic cores allow higher inductances to be created in a smaller volume and to improve magnetic coupling between coils. A problem with most magnetic materials is that they are rigid and thus unable to mechanically deform significantly without permanent damage.

Another example of a device with a magnetic core is a tracking sensor for use with an elongate intrusive medical device, such as a catheter, guidewire, sheath, or corewire. Such tracking coils may be used, for example, to determine a position of a distal end of the elongate intrusive medical device in a patient, such that a diagnostically relevant position determination may be made. It is known to use a tracking sensor that has a rigid magnetic core surrounded by a wire coil, for use in medical applications. However, it has been identified that the rigid core may break if subject to even minor axial or torsional deflections, thus degrading the sensing capability of the tracking sensor, if not totally rendering the tracking sensor inoperable.

What is needed in the art is an electromagnetic tracking sensor that may have a flexible hollow core and/or a core with channels formed in a surface of the core, so as to promote flexibility of the core and of the resulting electromagnetic tracking sensor.

SUMMARY OF INVENTION

The present invention provides an electromagnetic tracking sensor that may have a flexible hollow core and/or a core with channels formed in a surface of the core, so as to promote flexibility of the core and of the resulting electromagnetic tracking sensor.

The invention in one form is directed to an electromagnetic tracking sensor for use in a medical device that includes a flexible hollow cylinder core having an interior surface and an exterior surface. The flexible hollow cylinder core has a magnetic material layer attached to the interior surface of the flexible hollow cylinder core. A wire coil is adjacent to, and circumferentially surrounds, the exterior surface of the flexible hollow cylinder core.

The invention in another form is directed to a method of manufacturing an electromagnetic tracking sensor, including providing a flexible polymer substrate having a thickness defined by a first surface spaced from a second surface, and having a width defined by a first longitudinal edge spaced from a second longitudinal edge; forming a magnetic material layer on the flexible polymer substrate by adhering a magnetic powder material to the first surface of the flexible polymer substrate; forming a hollow cylinder core by positioning the first longitudinal edge of the flexible polymer substrate adjacent to the second longitudinal edge of the flexible polymer substrate, wherein the magnetic material layer is located in an interior of the hollow cylinder core; and winding a wire around an exterior of the hollow cylinder core to form a wire coil adjacent to, and circumferentially surrounding, the second surface of the flexible polymer substrate of the hollow cylinder core.

The invention in another form is directed to an invasive medical device that includes a flexible elongate member having a distal end portion. A flexible electromagnetic tracking sensor is connected to the distal end portion of the elongate member. The flexible electromagnetic tracking sensor includes a flexible hollow cylinder core having an interior surface and an exterior surface, and having a magnetic material layer attached to the interior surface of the flexible hollow cylinder core. A wire coil is adjacent to, and circumferentially surrounds, the exterior surface of the flexible hollow cylinder core.

The invention in another form is directed to an invasive medical device having a flexible elongate member having a distal end portion. A flexible electromagnetic tracking sensor is connected to the distal end portion of the elongate member. The electromagnetic tracking sensor includes a flexible ferrous core having an outer surface. The outer surface includes a plurality of channels. A wire coil is adjacent to, and circumferentially surrounds, the outer surface of the flexible core.

An advantage of the present invention is that the flexible electromagnetic tracking sensor having a flexible core of the present invention is that the flexible electromagnetic tracking sensor is less likely to break during use in tracking of an invasive medical device, in comparison to an electromagnetic tracking sensor having a non-flexible core.

Another advantage is that the flexible electromagnetic tracking sensor having a flexible core of the present invention provides improved tracking performance, in comparison to an electromagnetic tracking sensor having a non-flexible core, when used in tracking a position of a flexible elongate invasive medical device (e.g., a catheter) through a tortuous path (e.g., a blood vessel), since the flexible electromagnetic tracking sensor can bend and flex with the elongate invasive medical device through the tortuous path.

BRIEF DESCRIPTION OF DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 10A-10F show side views of an alternative flexible ferrous core having various patterns of a plurality of channels formed in an outer surface of the core to promote flexibility, which may be substituted for the flexible hollow cylinder core of the flexible electromagnetic tracking sensor shown in FIGS. 1-4, wherein:

FIG. 10A is a side view of the flexible ferrous core, wherein the plurality of channels is in the form of a plurality of ovals formed in the outer surface around the cylindrical circumference of the flexible ferrous core;

FIG. 10B is a side view of the flexible ferrous core, wherein the plurality of channels is in the form of a plurality of S-shaped slots formed in the outer surface around the cylindrical circumference of the flexible ferrous core;

FIG. 10C is a side view of the flexible ferrous core, wherein the plurality of channels is in the form of a plurality of angled-tooth slots formed in the outer surface around the cylindrical circumference of the flexible ferrous core;

FIG. 10D is a side view of the flexible ferrous core, wherein the plurality of channels is in the form of a plurality of T-shaped slots formed in the outer surface around the cylindrical circumference of the flexible ferrous core;

FIG. 10E is a side view of the flexible ferrous core, wherein the plurality of channels is in the form of a plurality of staggered radial slots formed in the outer surface around the cylindrical circumference of the flexible ferrous core; and FIG. 10F is a side view of the flexible ferrous core, wherein the plurality of channels is in the form of a plurality of V-shaped slots formed in the outer surface around the cylindrical circumference of the flexible ferrous core.

Corresponding reference characters indicate corresponding parts throughout the several views. The exemplifications set out herein illustrate at least one embodiment of the invention, and such exemplifications are not to be construed as limiting the scope of the invention in any manner.

DESCRIPTION OF EMBODIMENTS

Figure 1:
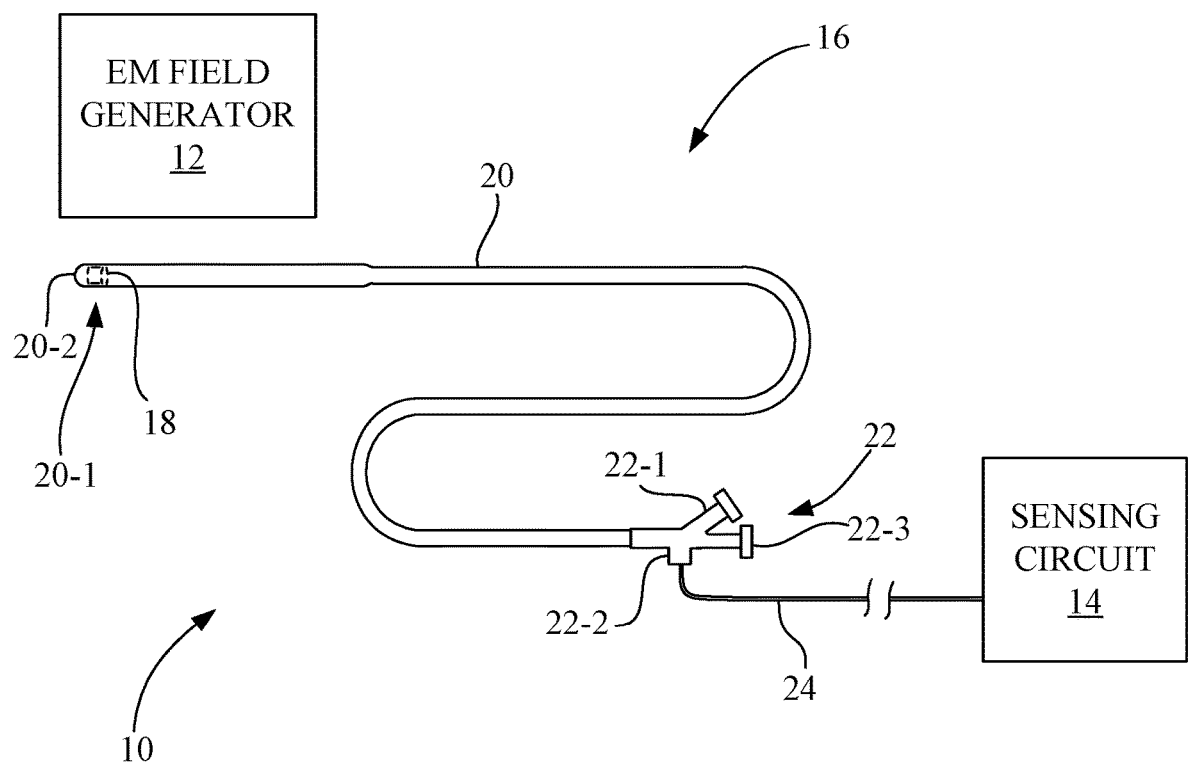
FIG. 1 is diagrammatic representation of an electromagnetic device tracking system having an electromagnetic (EM) field generator, a sensing circuit, and an invasive medical device configured in accordance with an aspect of the present invention to include a flexible electromagnetic tracking sensor.

Referring now to the drawings, and more particularly, to FIG. 1, there is shown an electromagnetic device tracking system 10 having an electromagnetic (EM) field generator 12, a sensing circuit 14, and an invasive medical device 16 configured in accordance with an aspect of the present invention to include a flexible electromagnetic tracking sensor 18.

EM field generator 12 is typical of that known in the art. In practice, EM field generator 12 is placed near an area of interest of a patient, and is used in triangulating the location of one or more tracked elements, i.e., flexible electromagnetic tracking sensor 18, disposed on or in invasive medical device 16. EM field generator 12 may be, for example, the field generator of an Aurora® Electromagnetic Tracking System available from Northern Digital Inc. (NDI), which generates a base electromagnetic field that radiates in a known orientation to facilitate electromagnetic spatial measurement.

Invasive medical device 16 includes a flexible elongate member 20. Invasive medical device 16 may be, for example, a catheter, a sheath, or a guide wire.

In the present embodiment depicted in FIG. 1, invasive medical device 16 is in the form of a catheter that also includes a body 22 connected to the flexible elongate member 20. Body 22 may include ports, such as a fluid port 22-1, an electrical connection port 22-2, and an auxiliary port 22-3. Fluid port 22-1 may be used to facilitate connection to a fluid source (not shown), such as a saline source. Electrical connection port 22-2 may be used to facilitate electrical connection to flexible electromagnetic tracking sensor 18. Flexible elongate member 20 is configured, e.g., sized and shaped, for insertion into a patient. Flexible elongate member 20 has a distal end portion 20-1 that terminates at a distal tip 20-2.

In the present embodiment, a flexible electromagnetic tracking sensor 18 is mounted at distal end portion 20-1 of invasive medical device 16 near distal tip 20-2. In the context of the preceding sentence, the term "near" is a range of zero to 2 centimeters (cm), and the extent of distal end portion 20-1 is in a range of 1 millimeter (mm) to 3 cm. Those skilled in the art will recognize, however, that the exact location of the placement of flexible electromagnetic tracking sensor 18 on invasive medical device 16 will depend on the portion of invasive medical device 16 that is to be tracked. Flexible electromagnetic tracking sensor 18 allows the location of invasive medical device 16 to be determined due to the interaction between EM field generator 12 and flexible electromagnetic tracking sensor 18.

Flexible electromagnetic tracking sensor 18 may be used to generate location data defining five degrees of freedom based on the EM field generated by EM field generator 12. The five degrees of freedom are the X-axis, Y-axis, Z-axis, pitch, and yaw. A sixth degree of freedom, i.e., roll, may be also included, if desired.

Flexible electromagnetic tracking sensor 18 of invasive medical device 16 is communicatively coupled to sensing circuit 14 via an electrical cable 24. Sensing circuit 14 may include a processor circuit configured to execute program instructions to process the electrical signals received from flexible electromagnetic tracking sensor 18, so as to determine a position of flexible electromagnetic tracking sensor 18 relative to the field generated by EM field generator 12, and may in turn, correlate the position information to a 2D or 3D imaging space, as is known in the art.

In the present example, flexible electromagnetic tracking sensor 18 is connected to distal end portion 20-1 of the flexible elongate member 20 for use in medical device applications. Flexible electromagnetic tracking sensor 18 may be embedded, in whole or in part, in flexible elongate member 20, or may be attached to flexible elongate member 20 by an adhesive.

Figure 2:
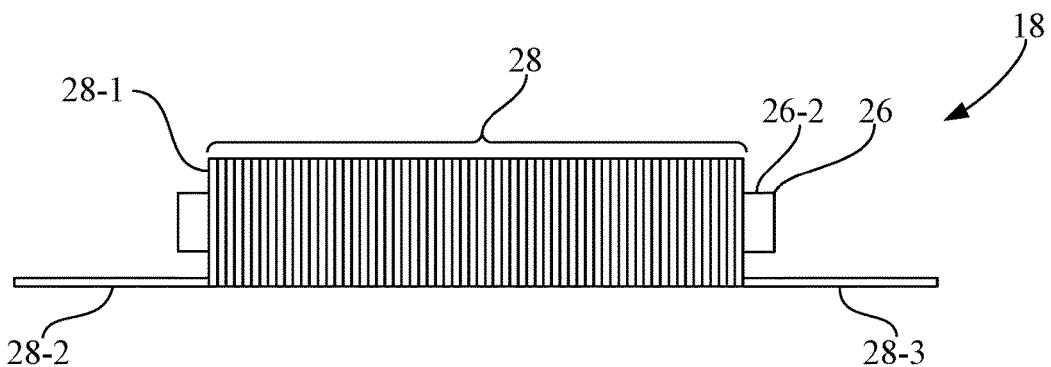
FIG. 2 is an enlarged side view of the flexible electromagnetic tracking sensor of FIG. 1.
Figure 3:
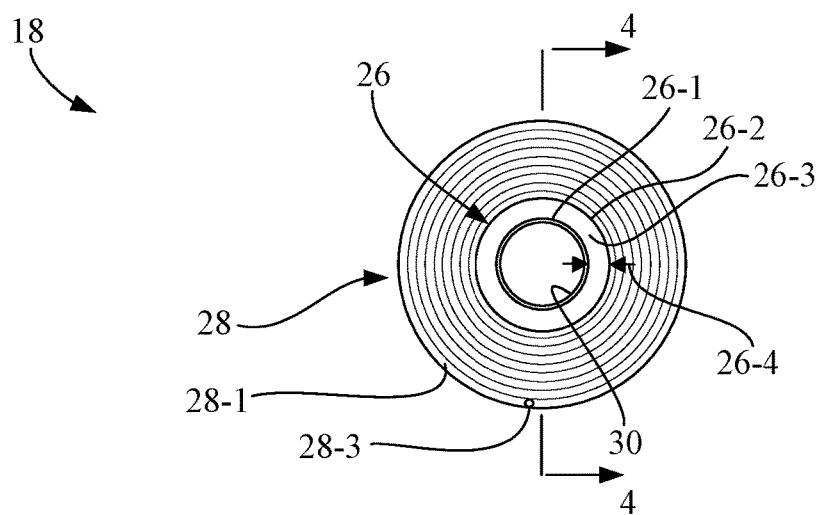
FIG. 3 is a further enlarged end view of the flexible electromagnetic tracking sensor of FIG. 1.
Figure 4:
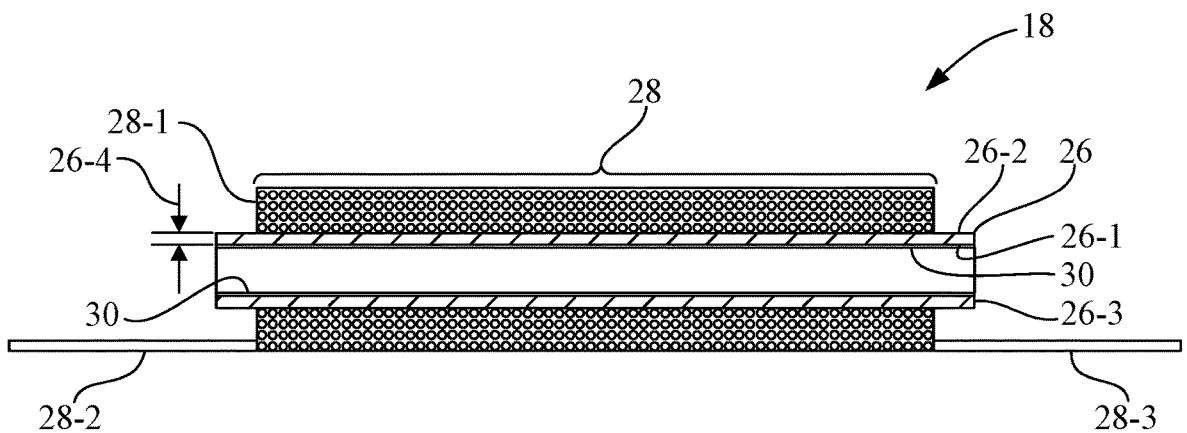
FIG. 4 is a section view of the flexible electromagnetic tracking sensor of FIG. 1 taken along line 4-4 of FIG. 3.

Referring also to FIGS. 2-4, in the present embodiment, flexible electromagnetic tracking sensor 18 includes a flexible hollow cylinder core 26 and a wire coil 28.

Flexible hollow cylinder core 26 has an interior surface 26-1 and an exterior surface 26-2. Flexible hollow cylinder core 26 also includes a magnetic material layer 30 attached to the interior surface 26-1 of the flexible hollow cylinder core 26.

Flexible hollow cylinder core 26 has a side wall 26-3 that has a thickness 26-4, wherein wire coil 28 is separated from magnetic material layer 30 of flexible hollow cylinder core 26 by the thickness 26-4 of side wall 26-3 of flexible hollow cylinder core 26. Flexible hollow cylinder core 26 may be, for example, in the form of a polymer tube.

Magnetic material layer 30 may be, for example, a layer of ferromagnetic material that is applied to interior surface 26-1 of flexible hollow cylinder core 26. Materials suitable for forming magnetic material layer 30 include, for example, samarium cobalt with iron, NdFeB, ferrite, CoFeSiB, CoFe-CrSiB, and a FeNi alloy that may include other elements, such as Mn, Mo, Co, Si, and B, with an Ni content being in a range of 60-95 percent volume of the materials. The materials can be provided in various forms, such as a powder-adhesive mixture, for use in forming magnetic material layer 30.

For example, magnetic material layer 30 may be formed as a layer of ferromagnetic material, wherein a ground ferrite powder is applied as a ferromagnetic powder coating to interior surface 26-1 of flexible hollow cylinder core 26. Alternatively, magnetic material layer 30 may be formed as a layer of ferromagnetic material, wherein a ground ferrite powder is mixed with a polymer adhesive, that is flexible when cured, and which may be applied, e.g., printed, to form a film over interior surface 26-1 of flexible hollow cylinder core 26.

Wire coil 28 is adjacent to, and circumferentially surrounds, exterior surface 26-2 of flexible hollow cylinder core 26. Wire coil 28 may be formed, for example, by winding a wire 28-1 around exterior surface 26-2 of flexible hollow cylinder core 26, thereby circumferentially surrounding exterior surface 26-2 of flexible hollow cylinder core 26 with multiple wraps of wire 28-1. In some applications, wire 28-1 may be wound around the exterior of flexible hollow cylinder core 26 in a manner such that the longitudinal end portions of wire coil 28 are tapered relative to a diameter of a central portion of wire coil 28.

Wire 28-1 is a wire having an insulating coating, so as to prevent short circuiting between adjacent longitudinal and radial wraps of wire 28-1 that form wire coil 28. Also, wire 28-1 is made from a metal conductor having high conductivity, e.g., copper. The opposite end portions of wire 28-1 form a set of electrical leads 28-2, 28-3 of wire coil 28. The set of electrical leads 28-2, 28-3 of wire coil 28 are connected to electrical cable 24, so as to electrically couple wire coil 28 of flexible electromagnetic tracking sensor 18 to sensing circuit 14.

Figure 5:
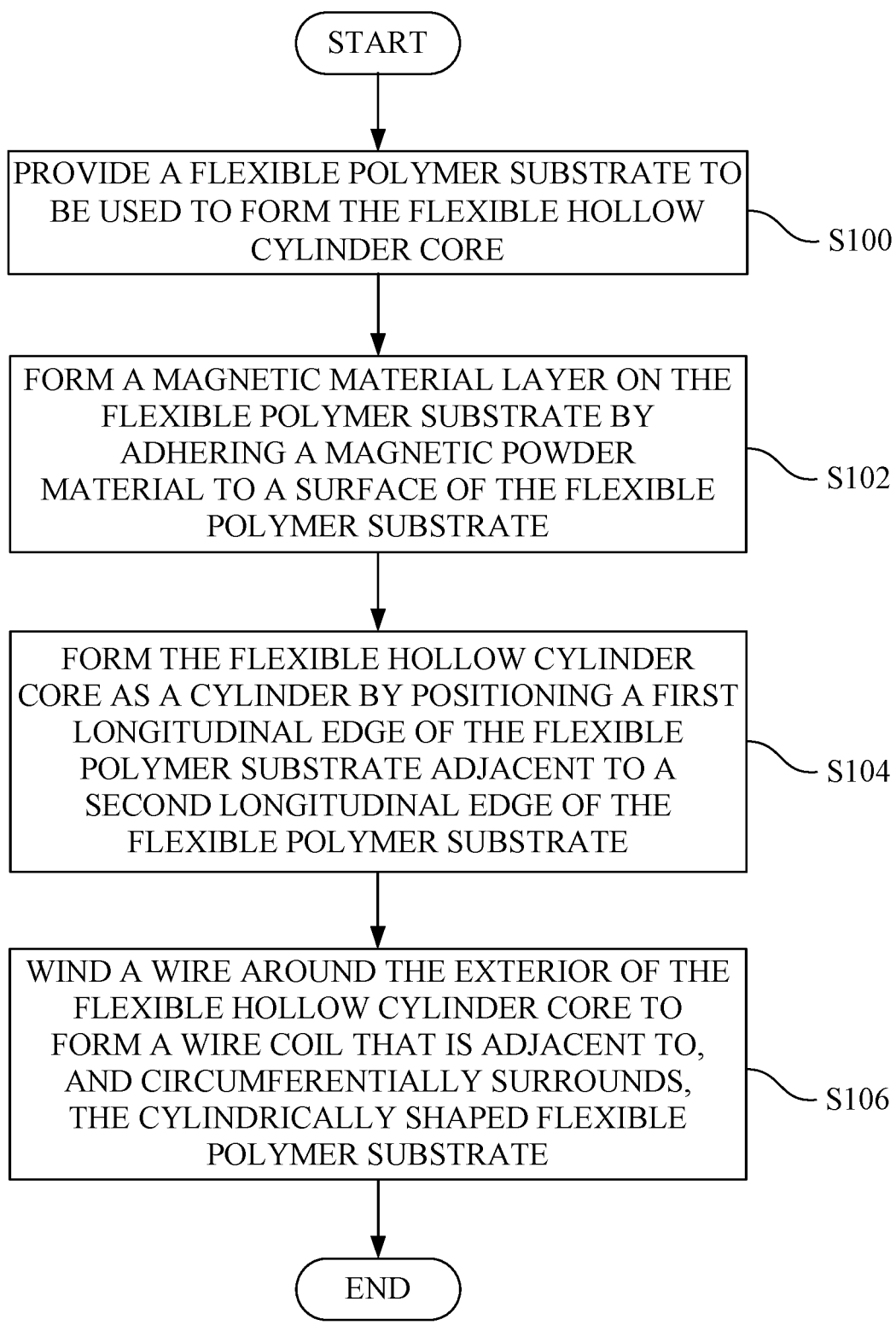
FIG. 5 is a flowchart depicting a method of manufacturing the flexible electromagnetic tracking sensor of FIG. 1.
Figure 6:
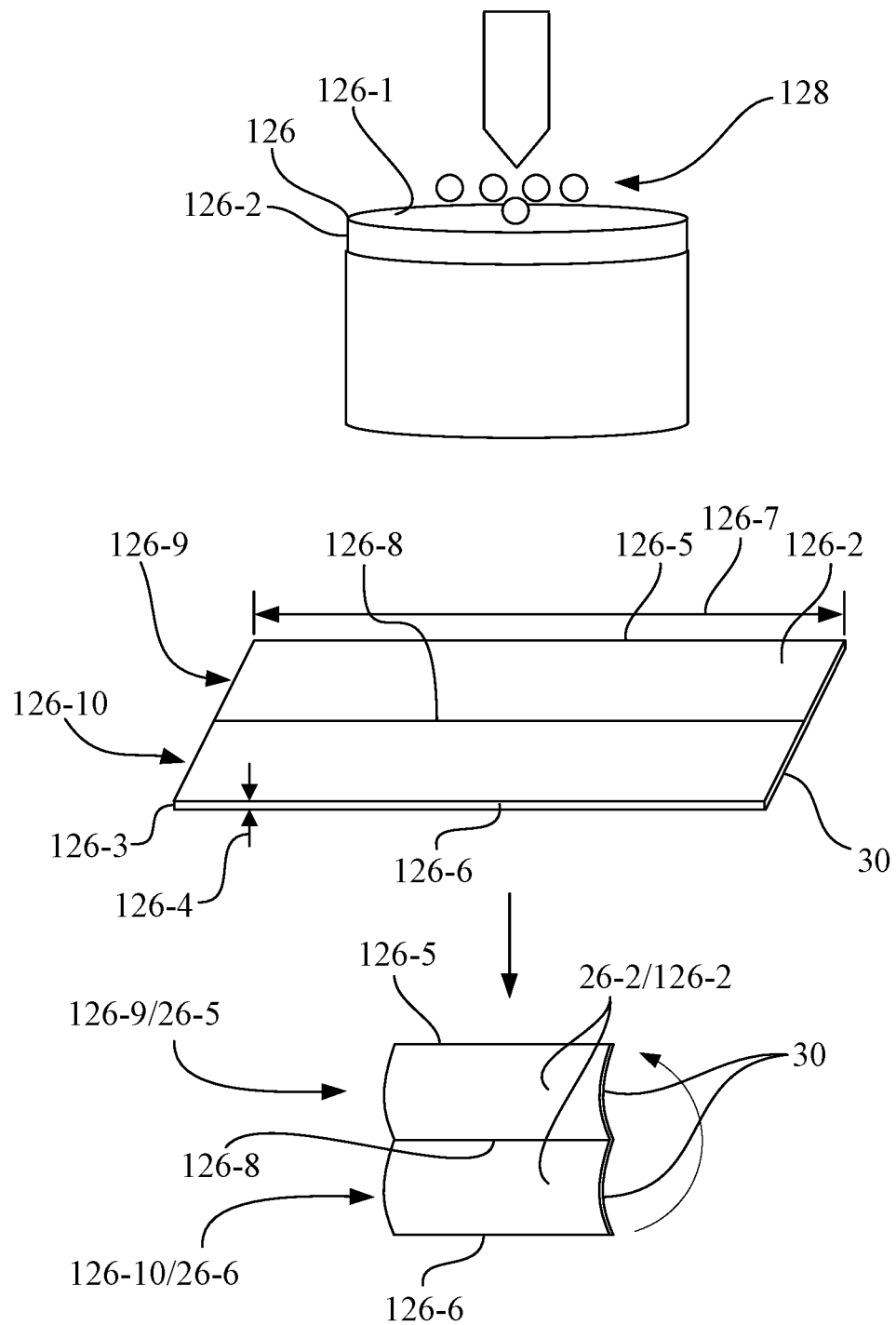
FIG. 6 is a pictorial representation of a spin-coating process for forming a magnetic material layer on a substrate, and the forming of the substrate into a flexible hollow cylinder core, in accordance with an aspect of the method depicted by the flowchart of FIG. 5.
Figure 7:
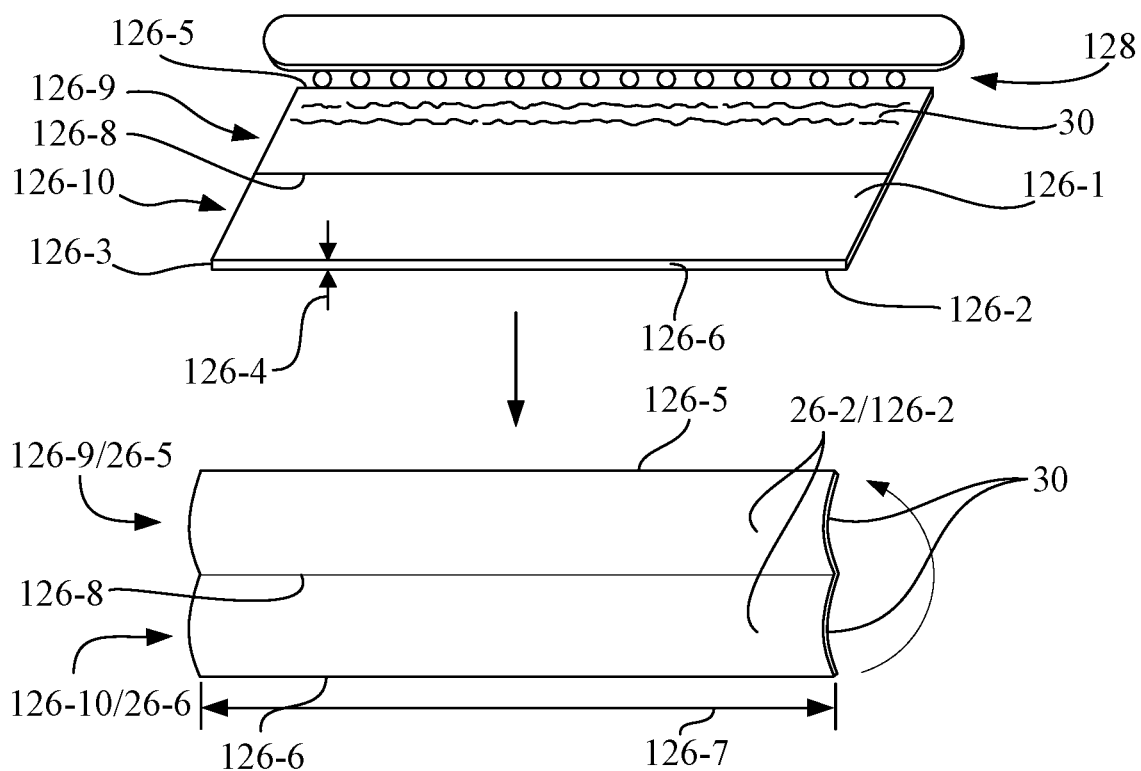
FIG. 7 is a pictorial representation of a screen-printing process for forming a magnetic material layer on a substrate, and the forming of the substrate into a flexible hollow cylinder core, in accordance with an aspect of the method depicted by the flowchart of FIG. 5.

Referring to FIG. 5, with reference also to FIGS. 6 and 7, there is depicted a method of manufacturing flexible electromagnetic tracking sensor 18 shown in FIGS. 2-4.

At step S100, a flexible polymer substrate 126, such as a polyimide substrate, for example, is provided to be used to form flexible hollow cylinder core 26. Flexible polymer substrate 126 has a first surface 126-1, a second surface 126-2, side wall 126-3, a thickness 126-4, a first longitudinal edge 126-5, a second longitudinal edge 126-6, and a width 126-7.

Thickness 126-4 of flexible polymer substrate 126 defines a distance that first surface 126-1 is spaced from second surface 126-2. Width 126-7 defines a distance that first longitudinal edge 126-5 is spaced from second longitudinal edge 126-6.

At step S102, the magnetic material layer 30 is formed on flexible polymer substrate 126 by adhering a magnetic powder material 128 to first surface 126-1 of flexible polymer substrate 126.

The step of forming magnetic material layer 30 may be performed, for example, by one of spin-coating (see FIG. 6) or screen-printing (see FIG. 7) magnetic powder material 128 onto first surface 126-1 of flexible polymer substrate 126.

A polyimide coating may be applied over the magnetic material layer 30. Also, a polyethylene layer may be applied to second surface 126-2, if desired.

At step S104, the flexible hollow cylinder core 26 is formed by positioning the first longitudinal edge 126-5 of flexible polymer substrate 126 adjacent to second longitudinal edge 126-6 of flexible polymer substrate 126, such that magnetic material layer 30 is located in an interior of flexible hollow cylinder core 26.

Figure 8:
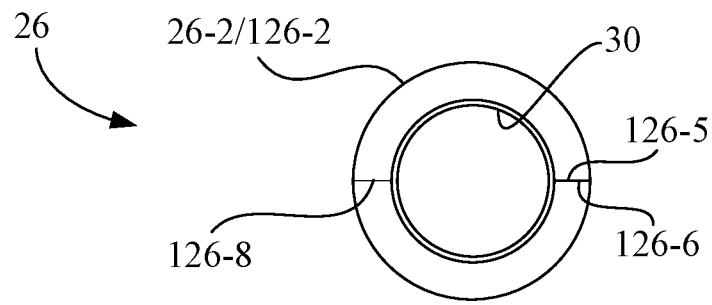
FIG. 8 is an enlarged end view of the assembled flexible hollow cylinder core of FIGS. 6 and 7.
Figure 9:
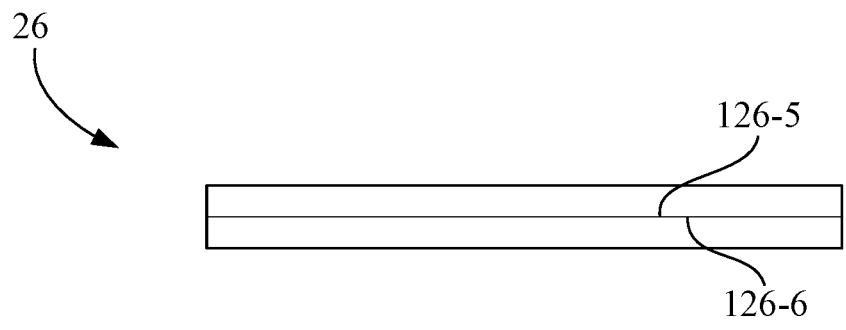
FIG. 9 is a side view of the assembled flexible hollow cylinder core of FIG. 8.

For example, the step S104 of forming flexible hollow cylinder core 26 may be performed by the following sequential sub-steps of:

1) forming the flexible polymer substrate 126 as a rectangular flexible polymer substrate 126 that has first longitudinal edge 126-5 spaced from second longitudinal edge 126-6;

2) defining a fold line 126-8 between the first longitudinal edge 126-5 and the second longitudinal edge 126-6 (see FIGS. 6 and 8), wherein the fold line divides the rectangular flexible polymer substrate 126 to define a first portion 126-9 and a second portion 126-10;

3) rolling each of the first portion 126-9 and the second portion 126-10 into two half-cylinder portions 26-5, 26-6 (see FIGS. 6 and 7), e.g., symmetrical half-cylinder portions, wherein half-cylinder portion 26-5 and half-cylinder portion 26-6 are separated by fold line 126-8; and 4) folding the rectangular flexible polymer substrate 126, having half-cylinder portions 26-5, 26-6, at fold line 126-8 to position first longitudinal edge 126-5 adjacent to second longitudinal edge 126-6 (see FIGS. 8 and 9), so as to complete the formation of the shape of flexible hollow cylinder core 26, and wherein second surface 126-2 of the rectangular flexible polymer substrate 126 becomes the exterior surface 26-2 of flexible hollow cylinder core 26.

Optionally, first longitudinal edge 126-5 may be adhered to second longitudinal edge 126-6, e.g., by an adhesive, such as an epoxy.

Alternatively, it is contemplated that the step S104 of forming flexible hollow cylinder core 26 may be performed by foregoing the sub-step of defining a fold line 126-8, wherein the rectangular flexible polymer substrate 126 is forced into a cylindrical shape so as to position first longitudinal edge 126-5 adjacent second longitudinal edge 126-6. In doing so, second surface 126-2 of the rectangular flexible polymer substrate 126 becomes the exterior surface 26-2 of flexible hollow cylinder core 26.

At step S106, referring to FIGS. 2-4, wire 28-1 is wound around the exterior of flexible hollow cylinder core 26 to form wire coil 28 that is adjacent to, and circumferentially surrounds, the cylindrically shaped second surface 126-2 of the flexible polymer substrate 126, i.e., adjacent to, and circumferentially surrounding exterior surface 26-2 of flexible hollow cylinder core 26. In one embodiment, the wire 28-1 may be wound around the exterior of flexible hollow cylinder core 26 such that the longitudinal end portions of wire coil 28 are tapered relative to a diameter of a central portion of wire coil 28.

Optionally, a further step may be performed to encapsulate flexible electromagnetic tracking sensor 18 with an electrically and thermally insulating coating, e.g., a polyimide coating. For example, the coating of insulating material may be applied over wire coil 28 and any exposed portion of second surface 126-2 that forms exterior surface 26-2 of flexible hollow cylinder core 26, and if desired, also over magnetic material layer 30 adhered to the first surface 126-1 that forms interior surface 26-1 of flexible hollow cylinder core 26.

Referring to FIGS. 10A-10F, as an alternative to flexible electromagnetic tracking sensor 18 having flexible hollow cylinder core 26, it is contemplated that a flexible ferrous core 200 may be substituted for flexible hollow cylinder core 26. Materials suitable for forming flexible ferrous core 200 include, for example, samarium cobalt with iron, NdFeB, ferrite, CoFeSiB, CoFeCrSiB, and a FeNi alloy having other elements, such as Mn, Mo, Co, Si, and B, with Ni being in a range of 60-95 percent of the materials. The materials can be provided in various forms, such as a powder-adhesive mixture, for use in forming flexible ferrous core 200.

Flexible ferrous core 200 may be in either of a flexible ferrite hollow core configuration, or may be in the form of a solid flexible ferrite core. In the hollow core configuration, the entirety of the body of the core may be made from ferrous material, or a layer of ferrous material may be applied to an inner or outer surface of a polymer tube.

In the embodiments shown in FIGS. 10A-10F, the flexibility of flexible ferrous core 200 is at least partially attributed to a plurality of channels 202 formed on the exterior of flexible ferrous core 200. As shown in FIGS. 10A-10F, for example, the plurality of channels 202 may take the form of a plurality of different slot patterns. Also, optionally, flexible hollow cylinder core 26, described above, may be modified to include the plurality of channels 202 on exterior surface 26-2 to further promote the flexibility of flexible hollow cylinder core 26. In all embodiments having the plurality of channels 202, a channel depth may be, for example, in a range of 10 micrometers (μm) to 20,000 μm, and a channel width may be, for example, in a range of 1 μm to 1000 μm.

Referring to FIG. 10A-10F, flexible ferrous core 200 has an outer surface 204, wherein the plurality of channels 202 are formed in outer surface 204 so as to promote the flexibility of flexible ferrous core 200. The plurality of channels 202 may be cut, e.g., laser-cut, into outer surface 204.

The plurality of channels 202 may be arranged as a repeating pattern of slots along a longitudinal extent of the flexible ferrous core 200, and around the cylindrical circumference of flexible ferrous core 200. Advantageously, each of the patterns of the plurality of channels 202 depicted in FIGS. 10A-10F facilitates both longitudinal and torsional flexibility.

Figure 10A:
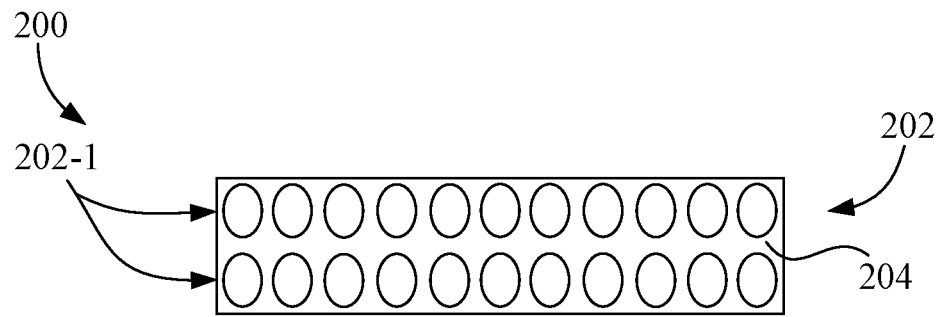

FIG. 10A shows the flexible ferrous core 200, wherein the plurality of channels 202 is in the form of a plurality of ovals 202-1 formed in outer surface 204 around the cylindrical circumference of flexible ferrous core 200.

Figure 10B:
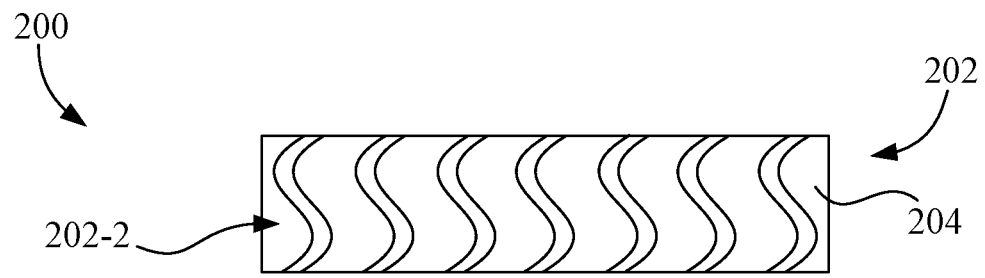

FIG. 10B shows the flexible ferrous core 200, wherein the plurality of channels 202 is in the form of a plurality of S-shaped slots 202-2 formed in outer surface 204 around the cylindrical circumference of flexible ferrous core 200.

Figure 10C:
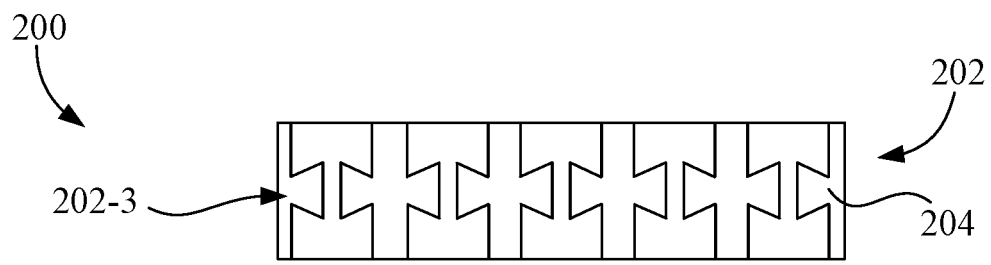

FIG. 10C shows the flexible ferrous core 200, wherein the plurality of channels 202 is in the form of a plurality of angled-tooth slots 202-3 formed in outer surface 204 around the cylindrical circumference of flexible ferrous core 200.

Figure 10D:
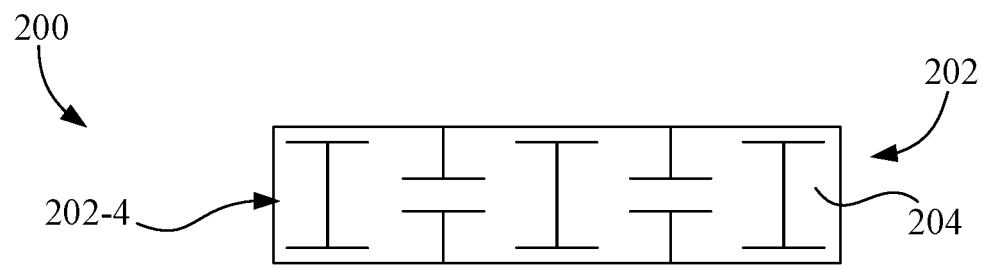

FIG. 10D shows the flexible ferrous core 200, wherein the plurality of channels 202 is in the form of a plurality of T-shaped slots 202-4 formed in outer surface 204 around the cylindrical circumference of flexible ferrous core 200.

Figure 10E:
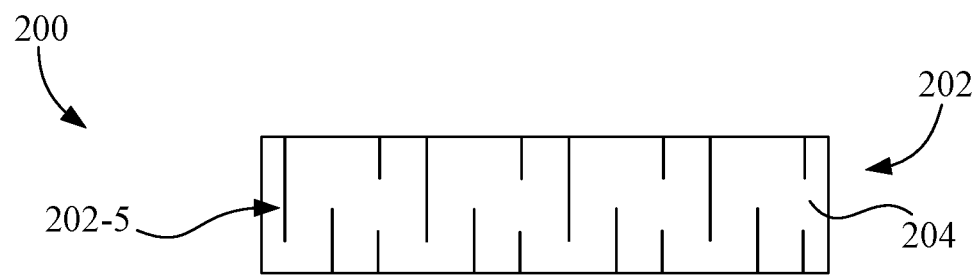

FIG. 10E shows the flexible ferrous core 200, wherein the plurality of channels 202 is in the form of a plurality of staggered radial slots 202-5 formed in outer surface 204 around the cylindrical circumference of flexible ferrous core 200.

Figure 10F:
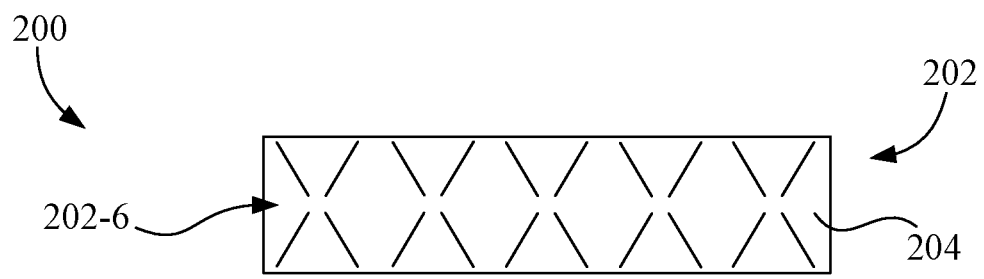

FIG. 10F shows the flexible ferrous core 200, wherein the plurality of channels 202 is in the form of a plurality of V-shaped slots 202-6 formed in outer surface 204 around the cylindrical circumference of flexible ferrous core 200.

Completion of the construction of flexible electromagnetic tracking sensor 18 using flexible ferrous core 200 requires formation of wire coil 28 adjacent to, and circumferentially surrounding, the outer surface 204 of the flexible ferrous core 200, in accordance with the process step S106, described above. Referring also to FIG. 1, flexible electromagnetic tracking sensor 18 may then be attached, e.g., embedded, in distal end portion 20-1 of flexible elongate member 20.

The following items also relate to the invention:

In one form, the invention relates to an electromagnetic tracking sensor for use in a medical device. The electromagnetic tracking sensor may include a flexible hollow cylinder core having an interior surface and an exterior surface, and may have a magnetic material layer attached to the interior surface of the flexible hollow cylinder core. A wire coil may be adjacent to, and/or circumferentially surround at least partially, the exterior surface of the flexible hollow cylinder core.

In the embodiment of the preceding paragraph, the flexible hollow cylinder core has a side wall having a thickness, and the wire coil may be separated from the magnetic material layer of the flexible hollow cylinder core by the thickness of the side wall of the flexible hollow cylinder core.

In any embodiment having the magnetic material layer, the magnetic material layer may be a ferromagnetic material.

In any embodiment having the magnetic material layer, the magnetic material layer may be a ferromagnetic powder coating.

In any of the embodiments, the wire coil may be a copper wire coil.

In another form, the invention relates to a method of manufacturing an electromagnetic tracking sensor, that may comprise the steps of: providing a flexible polymer substrate having a thickness defined by a first surface spaced from a second surface, and having a width defined by a first longitudinal edge spaced from a second longitudinal edge; forming a magnetic material layer on the flexible polymer substrate by adhering a magnetic powder material to the first surface of the flexible polymer substrate; forming a hollow cylinder core by positioning the first longitudinal edge of the flexible polymer substrate adjacent to the second longitudinal edge of the flexible polymer substrate, wherein the magnetic material layer may be located in an interior of the hollow cylinder core; and winding a wire around an exterior of the hollow cylinder core to form a wire coil adjacent to, and/or circumferentially surrounding at least partially, the second surface of the flexible polymer substrate of the hollow cylinder core.

In the method described above, the step of forming a magnetic material layer may be performed by one of spin-coating or screen-printing the magnetic powder material onto the first surface of the flexible polymer substrate.

In the method, the step of forming the hollow cylinder core may comprise the sequential steps of: forming the flexible polymer substrate as a rectangular flexible polymer substrate having the first longitudinal edge spaced from the second longitudinal edge; defining a fold line between the first longitudinal edge and the second longitudinal edge, the fold line dividing the rectangular flexible polymer substrate to define a first portion and a second portion; rolling each of the first portion and the second portion into half-cylinder portions separated by the fold line; and folding the rectangular flexible polymer substrate at the fold line to position the first longitudinal edge adjacent to the second longitudinal edge.

Optionally, the method may include adhering the first longitudinal edge to the second longitudinal edge.

Optionally, the method may include applying a coating of insulating material to the wire coil and any exposed portion of the second surface of the hollow cylinder core.

In another form, the invention relates to an invasive medical device that may include a flexible elongate member and a flexible electromagnetic tracking sensor having a flexible hollow cylinder core, such as embodiments of the flexible electromagnetic tracking sensor described above. The flexible elongate member has a distal end portion. The flexible electromagnetic tracking sensor may be connected to the distal end portion of the elongate member. The flexible electromagnetic tracking sensor may comprise the flexible hollow cylinder core and a wire coil. The flexible hollow cylinder core has an interior surface and an exterior surface, and may have a magnetic material layer attached to the interior surface of the flexible hollow cylinder core. The wire coil may be adjacent to, and/or circumferentially surround at least partially, the exterior surface of the flexible hollow cylinder core. Further conceivable embodiments are disclosed in the previous paragraphs.

In another form, the invention relates to an invasive medical device that may include a flexible elongate member and a flexible electromagnetic tracking sensor having a flexible ferrous core. The invention may also relate to a flexible electromagnetic tracking sensor having a flexible ferrous core, as described in the following, without a flexible elongate member having a distal end portion; and without the flexible electromagnetic tracking sensor being necessarily connected to the distal end portion of the elongate member. The flexible elongate member has a distal end portion. The flexible electromagnetic tracking sensor may be connected to the distal end portion of the elongate member. The flexible electromagnetic tracking sensor may comprise the flexible ferrous core having an outer surface, and wherein the outer surface includes a plurality of channels. The wire coil may be adjacent to, and/or circumferentially surround at least partially, the outer surface of the flexible core.

In any embodiment having the flexible elongate member, the flexible elongate member may be one of a catheter, a sheath, and a guide wire.

In any embodiment having the flexible ferrous core, the flexible ferrous core may be one of a flexible hollow cylinder core and a flexible solid core.

In any embodiment wherein the flexible ferrous core is a flexible hollow cylinder core, the flexible hollow cylinder core has an interior surface and an exterior surface, wherein the exterior surface may be the outer surface of the flexible core. A ferromagnetic material layer may be attached to the interior surface.

In any embodiment having the flexible hollow cylinder core, the flexible hollow cylinder core has a side wall having a thickness. In some embodiments, the wire coil may be separated from the ferromagnetic material layer of the flexible hollow cylinder core by the thickness of the side wall.

In any embodiment having the ferromagnetic material layer, the ferromagnetic material layer may be a ferromagnetic powder coating.

In any of the embodiments, the wire coil may be a copper wire coil.

In any embodiment having the plurality of channels, the plurality of channels may be arranged as a repeating pattern of slots along a longitudinal extent of the flexible ferrous core.

In any embodiment having the repeating pattern of slots, the repeating pattern of slots may be, for example, one or more of a plurality of oval slots, a plurality of S-shaped slots, a plurality of angled-tooth slots, a plurality of T-shaped slots, a plurality of staggered slots, and a plurality of V-shaped slots.

In any of the embodiments having the flexible elongate member, the flexible electromagnetic tracking sensor may be embedded in the distal end portion of the flexible elongate member.

As used herein, the term "flexible" means an object that is capable of undergoing an amount of axial deflection and/or torsional deformation without breaking, wherein the amount may be at least one degree of axial deflection and/or torsional deformation.

As used herein, any words of degree are relative modifiers intended to indicate permissible variation from the characteristic so modified.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electromagnetic tracking sensor for use in a medical device, comprising:
   a flexible polymer tube core configured to be coupled to the medical device and having an interior surface and an exterior surface, and having a magnetic material layer attached to the interior surface of the flexible polymer tube core; and
   a wire coil adjacent to, and circumferentially surrounding, the exterior surface of the flexible polymer tube core, wherein the wire coil is wound such that a central portion of the wire coil has a diameter larger than a first end portion and a second end portion of the wire coil and the wire coil tapers from the central portion to the first end portion and the second end portion.

2. The electromagnetic tracking sensor according to claim 1, wherein the flexible polymer tube core has a side wall having a thickness, and wherein the wire coil is separated from the magnetic material layer of the flexible polymer tube core by the thickness of the side wall of the flexible polymer tube core.

3. The electromagnetic tracking sensor according to claim 1, wherein the magnetic material layer is a ferromagnetic material.

4. The electromagnetic tracking sensor according to claim 1, wherein the magnetic material layer is a ferromagnetic powder coating.

5. The electromagnetic tracking sensor according to claim 1, wherein the wire coil is a copper wire coil.

6. An invasive medical device, comprising:
a flexible elongate member defining a distal end portion of the invasive medical device; and
a flexible electromagnetic tracking sensor connected to the distal end portion of the elongate member, wherein the flexible electromagnetic tracking sensor comprises:
a flexible polymer tube core having an interior surface and an exterior surface, and having a magnetic material layer attached to the interior surface of the flexible polymer tube core; and
a wire coil that is adjacent to, and circumferentially surrounds, the exterior surface of the flexible polymer tube core, wherein the wire coil is wound such that a central portion of the wire coil has a diameter larger than a first end portion and a second end portion of the wire coil and the wire coil tapers from the central portion to the first end portion and the second end portion.

7. An invasive medical device, comprising:
a flexible elongate member defining a distal end portion of the invasive medical device; and
a flexible electromagnetic tracking sensor connected to the distal end portion of the elongate member, wherein the flexible electromagnetic tracking sensor comprises:
a flexible ferrous core having an outer surface, and wherein the outer surface includes a plurality of channels; and
a wire coil that is adjacent to, and circumferentially surrounds, the outer surface of the flexible core, wherein the wire coil is wound such that a central portion of the wire coil has a diameter larger than a first end portion and a second end portion of the wire coil and the wire coil tapers from the central portion to the first end portion and the second end portion.

8. The invasive medical device according to claim 7, wherein the flexible elongate member is one of a catheter, a sheath, and a guide wire.

9. The invasive medical device according to claim 7, wherein the flexible ferrous core is one of a flexible hollow cylinder core and a flexible solid core.

10. The invasive medical device according to claim 7, wherein the flexible ferrous core is a flexible hollow cylinder core that has an interior surface and an exterior surface, the exterior surface being the outer surface of the flexible core, and having a ferromagnetic material layer attached to the interior surface.

11. The invasive medical device according to claim 10, wherein the flexible hollow cylinder core has a side wall having a thickness, and wherein the wire coil is separated from the ferromagnetic material layer of the flexible hollow cylinder core by the thickness of the side wall.

12. The invasive medical device according to claim 10, wherein the ferromagnetic material layer is a ferromagnetic powder coating.

13. The invasive medical device according to claim 7, wherein the wire coil is a copper wire coil.

14. The invasive medical device according to claim 7, wherein the plurality of channels is arranged as a repeating pattern of slots along a longitudinal extent of the flexible ferrous core.

15. The invasive medical device according to claim 14, wherein the repeating pattern of slots is one of a plurality of oval slots, a plurality of S-shaped slots, a plurality of angled-tooth slots, a plurality of T-shaped slots, a plurality of staggered slots, and a plurality of V-shaped slots.

16. The invasive medical device according to claim 7, wherein flexible electromagnetic tracking sensor is embedded in the distal end portion of the flexible elongate member.

17. The electromagnetic tracking sensor according to claim 1, further comprising:
a polyimide coating on the magnetic material layer opposite the flexible polymer tube core; and/or
a polyethylene layer applied to the exterior surface of the flexible polymer tube core.

18. The electromagnetic tracking sensor according to claim 1, wherein the magnetic material layer is provided as a film or coating so as to be disposed over the interior surface of the of the flexible polymer tube core.

19. The electromagnetic tracking sensor according to claim 1, wherein the hollow cylinder core comprises a fold line, wherein the fold line divides a rectangular flexible polymer substrate having a first longitudinal edge and a second longitudinal edge.

20. The electromagnetic tracking sensor of claim 1, wherein the electromagnetic tracking sensor is flexible in an axial and/or torsional direction.

* * * * *